(12) United States Patent
Shiao et al.

(10) Patent No.: US 8,215,610 B2
(45) Date of Patent: Jul. 10, 2012

(54) BI-DIRECTIONAL ELECTROMECHANICAL VALVE

(75) Inventors: Yaojung Shiao, Taipei (TW); Jian-Hau Huang, Siansi Township (TW)

(73) Assignee: National Taipei University of Technology, Taipei (TW)

( * ) Notice: Subject to any disclaimer, the term of this patent is extended or adjusted under 35 U.S.C. 154(b) by 375 days.

(21) Appl. No.: 12/535,792

(22) Filed: Aug. 5, 2009

(65) Prior Publication Data

US 2010/0084591 A1    Apr. 8, 2010

(30) Foreign Application Priority Data

Oct. 3, 2008    (TW) ................................ 97138271 A

(51) Int. Cl.
*F16K 31/02*    (2006.01)
(52) U.S. Cl. ...................... 251/129.16; 251/65; 335/234
(58) Field of Classification Search ................ 251/65, 251/129.16, 129.15, 129.11; 335/220–282
See application file for complete search history.

(56) References Cited

U.S. PATENT DOCUMENTS

| | | | | |
|---|---|---|---|---|
| 4,000,756 A | * | 1/1977 | Ule et al. ................. | 137/596.17 |
| 4,071,042 A | * | 1/1978 | Lombard et al. ............. | 137/332 |
| 4,221,163 A | * | 9/1980 | Anderson ................... | 101/93.01 |
| 4,313,794 A | * | 2/1982 | Chung ........................... | 376/352 |
| 4,325,412 A | * | 4/1982 | Hayner .................... | 137/625.65 |
| 4,366,944 A | * | 1/1983 | Kah, Jr. ..................... | 251/129.16 |
| 4,455,543 A | * | 6/1984 | Pischinger et al. ........... | 335/266 |
| 4,546,339 A | * | 10/1985 | Kubach .......................... | 335/230 |
| 4,794,890 A | * | 1/1989 | Richeson, Jr. ............. | 123/90.11 |
| 4,831,973 A | * | 5/1989 | Richeson, Jr. ............. | 123/90.11 |
| 4,883,025 A | * | 11/1989 | Richeson, Jr. ............. | 123/90.11 |
| 4,908,731 A | * | 3/1990 | Richeson, Jr. ................ | 361/159 |
| 4,910,487 A | * | 3/1990 | Kleinhappl ................... | 335/234 |
| 5,022,358 A | * | 6/1991 | Richeson .................. | 123/90.12 |
| 5,488,340 A | * | 1/1996 | Maley et al. .................. | 335/253 |
| 6,715,732 B2 | * | 4/2004 | Kumar ..................... | 251/129.16 |
| 7,011,076 B1 | * | 3/2006 | Weldon et al. ................ | 123/516 |
| 7,182,051 B2 | * | 2/2007 | Sedda et al. ................ | 123/90.11 |
| 7,750,772 B2 | * | 7/2010 | Hagen et al. .................. | 335/279 |
| 2008/0179553 A1 | * | 7/2008 | Walter ........................... | 251/65 |

* cited by examiner

*Primary Examiner* — John Fristoe, Jr.
*Assistant Examiner* — Matthew W Jellett
(74) *Attorney, Agent, or Firm* — Schmeiser, Olsen & Watts, LLP

(57) ABSTRACT

A bi-directional electromechanical valve comprising a cylindrical upper cover, two semi-cylindrical permanent magnets, two semi-cylindrical cases, a reverse U-shaped coil set, a cylindrical armature, a valve stem, a first spring and a second spring. The electromechanical valve can be opened and closed bi-directionally in a quick and powerful manner. With an integrated round-shaped design, the electromechanical valve not only reduces the dimensions, but also equalizes the valve wear caused by rotating valve during engine operations. The specially designed cylindrical armature and its button-shaped bottom provide a stronger magnetic holding force to improve the strokes of the armature. The design of a single coil set and permanent magnets reduces the coil volume and the driving power effectively. The armature will stop at a fail-to-safe position at a power failure to provide a better driving way for an engine intake/exhaust valve.

3 Claims, 5 Drawing Sheets

BI-DIRECTIONAL ELECTROMECHANICAL VALVE

CROSS-REFERENCE TO RELATED APPLICATIONS

This non-provisional application claims priority under 35 U.S.C. §119(a) on Patent Application No(s). 097138271 filed in Taiwan, R.O.C. on 3 Oct. 2008, the entire contents of which are hereby incorporated by reference.

FIELD OF THE INVENTION

The present invention relates to a bi-directional electromechanical valve, and more particularly to a valve structure and an operating device using electric power and magnetic force.

BACKGROUND OF THE INVENTION

In an internal combustion engine, an electromechanical valve is used to replace a conventional camshaft driving valve and bring out the possibility of a fully variable timing control valve, and thus researches and scholars are interested in electromechanical valves, and many control strategies are derived for the electromechanical valve including valve timing control, valve lift control, soft landing, and soft releasing control, etc. However, an electromechanical valve mechanism with a general design still has the following issues:

(1) Extra Energy Loss: When an engine is operated, the valve is usually situated at a fully closed or opened position most of the time, and a general electromechanical valve requires a large power consumption to maintain the valve at the fully closed or opened position, and thus incurring unnecessary additional power consumption.

(2) Initial starting Current: In the design of a general electromechanical valve, the armature is situated at a central equilibrium position, and thus it is necessary to supply a large initial-current to bring the armature to a fully closed position before the engine is started, and such arrangement also causes unnecessary additional power consumption.

(3) Uneven Valve Wear: The valve is rotated when the conventional engine is operated, and thus the valve wear generally occurs evenly at the position where the valve is in contact with a cylinder, and the design of a common electromechanical valve generally comes with a square armature, and thus the armature cannot be rotated with the engine. In addition to the uneven valve wear, indirect impacts are exerted on the armature and the walls of the valve structure, resulting in damages or wearing of the electromechanical valve after a long use.

(4) Large Volume of Electromechanical Valve Coil: To provide a large magnetic force for pushing the valve, the electromechanical valve usually has a coil having an enormous volume.

(5) Excess Overall Volume: The volume of the electromechanical valve is too large, and thus the installation space above the engine cylinder head is limited, and the level of difficulty of the installation is increased.

(6) Demagnetism of Permanent Magnet: In a magnetic path of a general electromechanical valve, the lines of magnetic force produced by an electromagnet are passed through the lines of magnetic force (with opposite polarity) of the permanent magnet, and thus the magnetism of the permanent magnet is degraded gradually and the holding force of the valve will be reduced to a level of unable to open the valve.

It is an objective of the present invention to develop an electromechanical valve to overcome the shortcomings of the prior art.

SUMMARY OF THE INVENTION

Therefore, it is a primary objective of the present invention to overcome the shortcomings of the conventional electromechanical valve by providing an electromechanical valve including a permanent magnet in the structure of the electromechanical valve, which is utilized to improve the holding force required for setting the valve for fully opened or closed position when engine is operated, and designing a novel armature structure, a novel overall structure, a novel electromechanical valve coil, and a novel magnetic path. Compared with the conventional electromechanical valve, the present invention has the following advantages:

(1) Improving Energy Consumption of Fixed-position Holding Force: By putting the semi-cylindrical permanent magnet at a specific position, we can provide sufficient holding forces to resist the resilience of the spring at a fully opened or closed position, so as to control the armature to be kept at the fully opened or closed position without consuming additional energy.

(2) Overcoming the Issue of initial starting Current: In general, the initial position of the armature of the conventional electromechanical valve is in the central equilibrium position between upper and lower coils, when the armature is not operated. But the invention changes such mechanical design to set the initial position of the armature to the fully closed position without consuming additional starting current, and provides a fail-to-safe function.

(3) Design of Cylindrical Mechanism: In general, an electromechanical valve comes with coils with E-shaped design, but the invention adopts a novel design with a cylindrical mechanical shape of the electromechanical valve and a cylindrical armature. In addition to a significantly reduced volume of the electromechanical valve, the invention also improves the uneven wear issue caused by the impact of the valve with the cylinder head and increases the density of lines of magnetic force per unit volume. The aforementioned effects have not been achieved by other conventional designs yet.

(4) Special Structural Design of Armature: In addition to the cylindrical design of the armature, the invention also provides a design of projecting a protruding cylinder at the position where the bottom of the armature comes in contact with the valve stem to improve the magnetic holding force for moving the armature to a fully opened position of the valve and has beneficial effects of opening the valve and reducing the required volume of the magnets.

(5) Special Layout of Permanent Magnets and Electromagnetic Coils: This layout can prevent the lines of magnetic force of the electromagnetic coil from passing through the permanent magnets and resulting in a permanent magnet demagnetism. More importantly, an electromagnetic force is applied to offset the magnetic forces of the permanent magnet in this layout, so that when the valve exits from a fully closed or opened state, this layout can convert a portion of the magnetic forces of the permanent magnets onto a reverse magnetic path of the electromagnetic force in order to offset the magnetic forces of the permanent magnets, reduce the energy required by the electromagnetic coils effectively, and overcome the shortcomings of the conventional electromechanical valves.

To achieve the foregoing objective, the present invention provides an electromechanical valve, comprising: a cylindrical upper cover; two semi-cylindrical permanent magnets, installed at the bottom of the cylindrical upper cover; two semi-cylindrical cases, installed at the bottom of the semi-cylindrical permanent magnets, and aligned and engaged with each other correspondingly to form a cylindrical shape having a first internal groove and a second internal groove; a reverse U-shaped coil set, installed in the first internal groove; a cylindrical armature, installed in the second internal groove; a valve stem, with an end comes in contact with the cylindrical armature, and having at least one valve stem latch disposed at the middle of the valve stem, and another end having a valve head that is used to open and close a valve port; a first spring, sheathed onto the valve stem, and installed between the cylindrical armature and the valve stem latch; and a second spring, sheathed onto the valve stem, and installed between the valve stem latch and the valve head.

Compared with the prior art, a bidirectional electromechanical valve of the present invention can achieve the effects of reducing the volume of the electromechanical valve, uniformly wearing the valve, and decreasing the required power consumption of the electromechanical valve.

DESCRIPTION OF THE PREFERRED EMBODIMENT

Other features and advantages of the present invention will become apparent in the following detailed description of the preferred embodiments with reference to the accompanying drawings.

Figure 1:
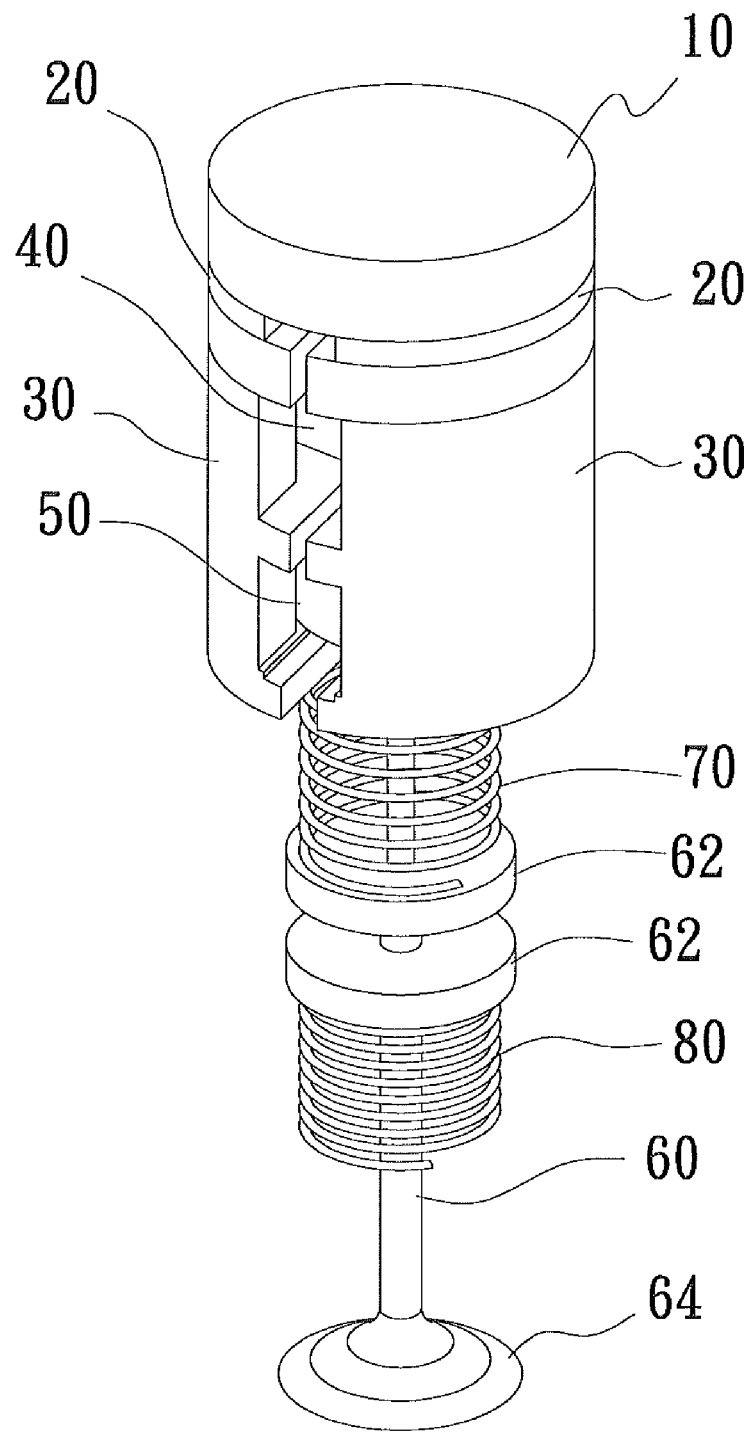
FIG. 1 is a perspective view of a bidirectional electromechanical valve in accordance with a preferred embodiment of the present invention.
Figure 2:
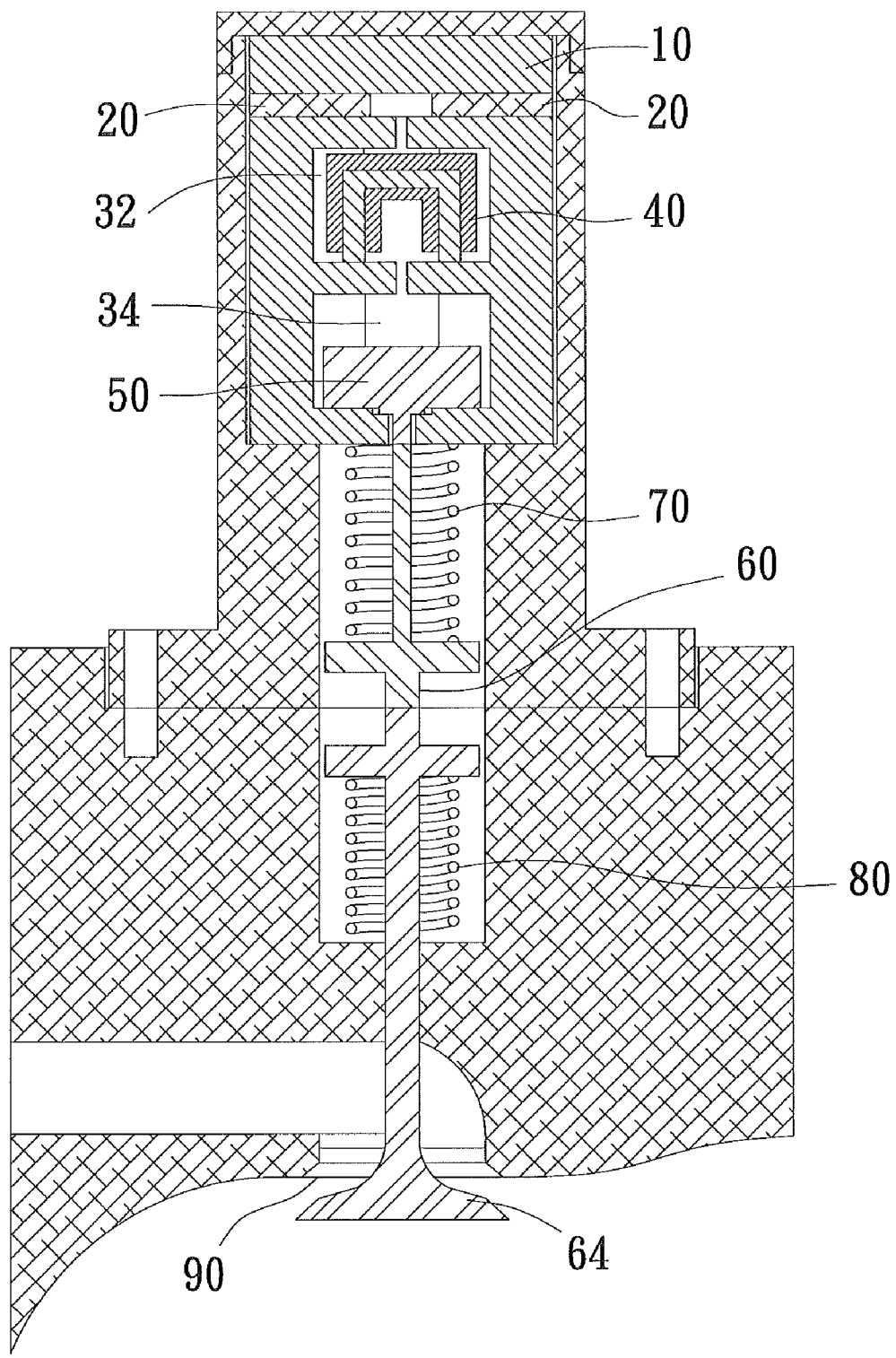
FIG. 2 is a schematic view of controlling a valve by a bi-directional electromechanical valve of the present invention.

With reference to FIG. 1 for a perspective view of a bi-directional electromechanical valve in accordance with a preferred embodiment of the present invention, the bi-directional electromechanical valve comprises a cylindrical upper cover 10, two semi-cylindrical permanent magnets 20, two semi-cylindrical cases 30, a reverse U-shaped coil set 40, a cylindrical armature 50, a valve stem 60, a first spring 70 and a second spring 80. The cylindrical upper cover 10 acts as the center for spreading the lines of magnetic force among the whole assembly. The semi-cylindrical permanent magnets 20 are installed at the bottom of the cylindrical upper cover 10 and act as the main source of magnetic force which is transmitted through the cylindrical upper cover 10 and the semi-cylindrical cases 30. The semi-cylindrical cases 30 are installed at the bottom of the semi-cylindrical permanent magnets 20, and the semi-cylindrical cases 30 are engaged with each other to form a cylindrical shape, having a first internal groove 32 and a second internal groove 34 (as shown in FIG. 2). The reverse U-shaped coil set 40 is installed in the first internal groove 32, such that if a specific current is supplied to the coil, the coil will produce a reversed magnetic field to offset the magnetic forces provided by the semi-cylindrical permanent magnets 20. The cylindrical armature 50 is installed in the second internal groove 34 to play an important role of opening and closing a valve 90. With the semi-cylindrical permanent magnets 20 for maintaining the opened or closed valve position of the valve 90, the cylindrical armature 50 can be attached onto the top or the bottom of the second internal groove 34 to achieve the effect of maintaining the opened or closed position while the engine is operated at different conditions, without consuming additional energy. The valve stem 60 has an end come in contact with the cylindrical armature 50, and at least one valve stem latch 62 disposed proximate to the middle of the valve stem 60. Another end of the valve stem 60 has a valve head 64 for opening or closing the valve 90. The first spring 70 is sheathed onto the valve stem 60 and installed between the cylindrical armature 50 and the valve stem latch 62. The second spring 80 is sheathed onto the valve stem 60 and installed between the valve stem latch 62 and the valve head 64.

Figure 3E:
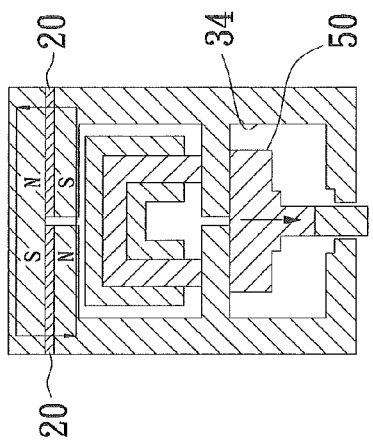
FIGS. 3a to 3f are schematic views of an armature being acted by a current and a magnetic force in a bidirectional electromechanical valve of the present invention.
Figure 3F:
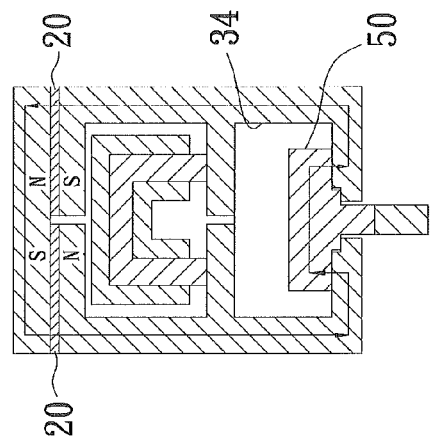
Figure 3D:
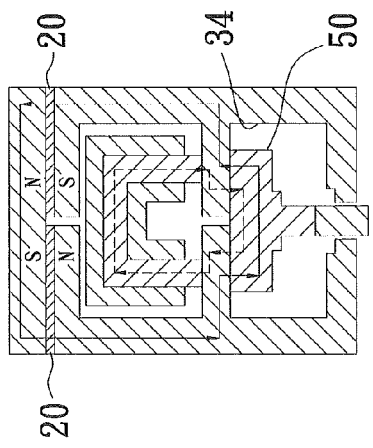
Figure 3A:
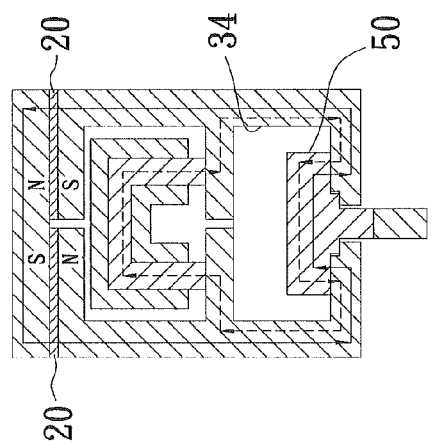
Figure 3C:
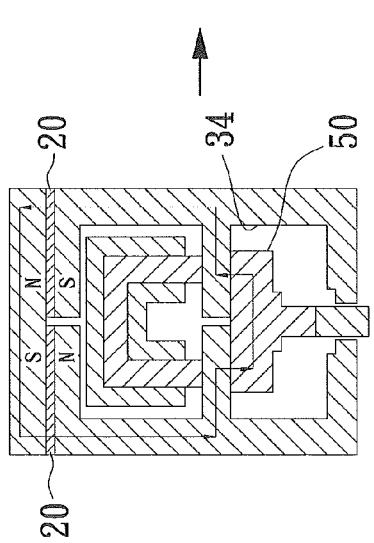
Figure 3B:
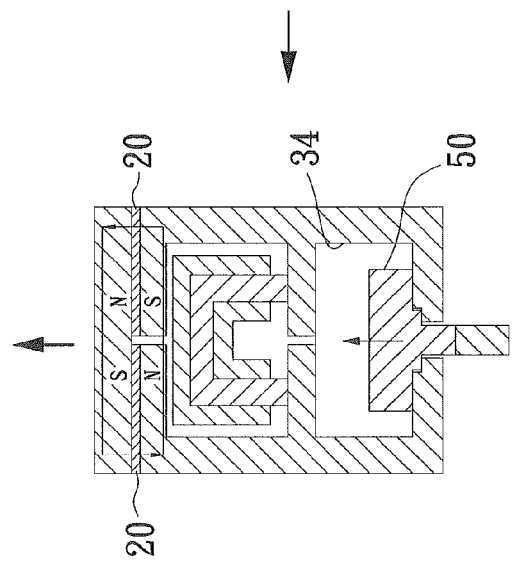

With reference to FIGS. 2 and 3a to 3f, FIG. 2 is a schematic view of controlling a valve by a bi-directional electromechanical valve with the preferred embodiment of the present invention, and FIGS. 3a to 3f are schematic views of an armature being acted by a current and a magnetic force in a bi-directional electromechanical valve in accordance with the preferred embodiment of the present invention respectively. The cylindrical armature 50 is disposed at the bottom of the second internal groove 34 (as shown in FIG. 3a), and a holding force provided by the semi-cylindrical permanent magnets 20 fixes the cylindrical armature 50 in position, such that the second spring 80 is compressed by the holding force to set the valve 90 in the opened position. If a current is passed to the reverse U-shaped coil set 40 to produce a reversed magnetic field to offset the magnetic forces produced by the semi-cylindrical permanent magnets 20 shown in FIG. 3b), then the cylindrical armature 50 will be moved upward towards the top of the second internal groove 34 by the resilience force produced by the second spring 80 (as shown in FIG. 3c). Finally, the cylindrical armature 50 is attached to the top of the second internal groove 34 (as shown in FIG. 3d), and the cylindrical armature 50 is fixed by the holding force provided by the semi-cylindrical permanent magnets 20, so that the first spring 70 is compressed to set the valve 90 to a closed position. If a specific current passing through the reverse U-shaped coil set 40 is provided for producing a reverse magnetic field to offset the magnetic forces produced by the semi-cylindrical permanent magnets 20 (as shown in FIG. 3e), then the cylindrical armature 50 will be acted by the resilience produced by the first spring 70 to move towards the bottom of the second internal groove 34 (as shown in FIG. 3f), and finally the cylindrical armature 50 will be attached to the bottom of the second internal groove 34 (as shown in FIG. 3a) to complete a movement path. If it is necessary to start the movement again, the same method of operating the electromechanical valve in accordance with the present invention is repeated.

Figure 4:
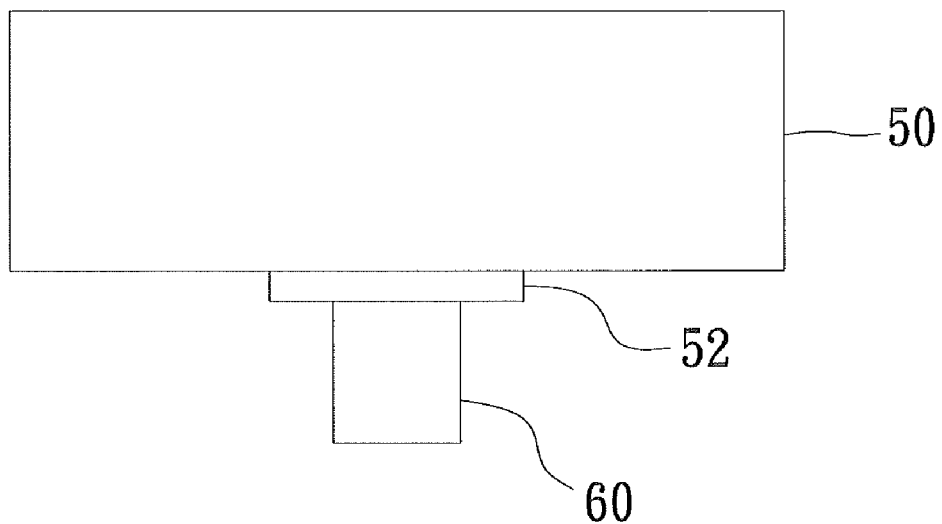
FIG. 4 is an enlarged view of a cylindrical armature in accordance with a preferred embodiment of the present invention.
Figure 5:
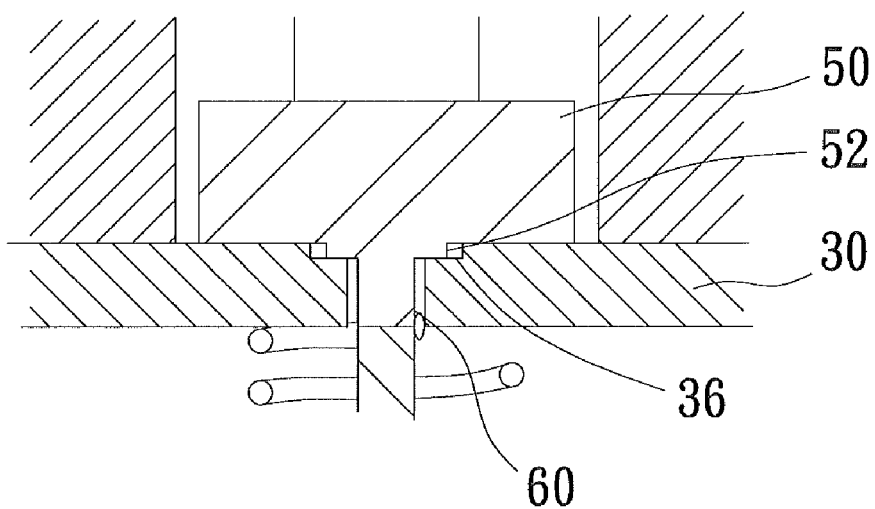
FIG. 5 is a schematic view of a cylindrical armature located inside semi-cylindrical cases in accordance with a preferred embodiment of the present invention.

With reference to FIGS. 4 and 5 for an enlarged view of a cylindrical armature and a schematic view of a cylindrical armature come in contact to the semi-cylindrical cases in accordance with a preferred embodiment of the present invention respectively. The cylindrical armature 50 has a protruding cylinder 52 disposed proximate to the bottom of the second internal groove 34, and the semi-cylindrical case 30 have a recession 36 disposed at a position corresponding to the protruding cylinder 52, wherein the height of the protruding cylinder 52 is equal to the depth of the recession 36. With the protruding cylinder 52 between the cylindrical armature 50 and the valve stem 60, when the cylindrical armature 50 is moving downward, the distance of transmitting the magnetic force for the conventional armature is shortened, and a large holding force can be provided for the downwardly moving armature, and thus faster speed and shorter time for opening the valve 90 is achieved to satisfy the limited time for valve opening at high engine speeds.

In a preferred embodiment of the present invention, the diameter of the protruding cylinder 52 is slightly smaller than the recession 36, such that a gap is formed when the protruding cylinder 52 is in contacted with the recession 36. Such design can prevent the spreading effect of the lines of magnetic force which results in a loss of holding forces in the system when the cylindrical armature 50 is connected to the semi-cylindrical case 30. With the gap design, the holding force required by the system can be achieved.

Figure 6:
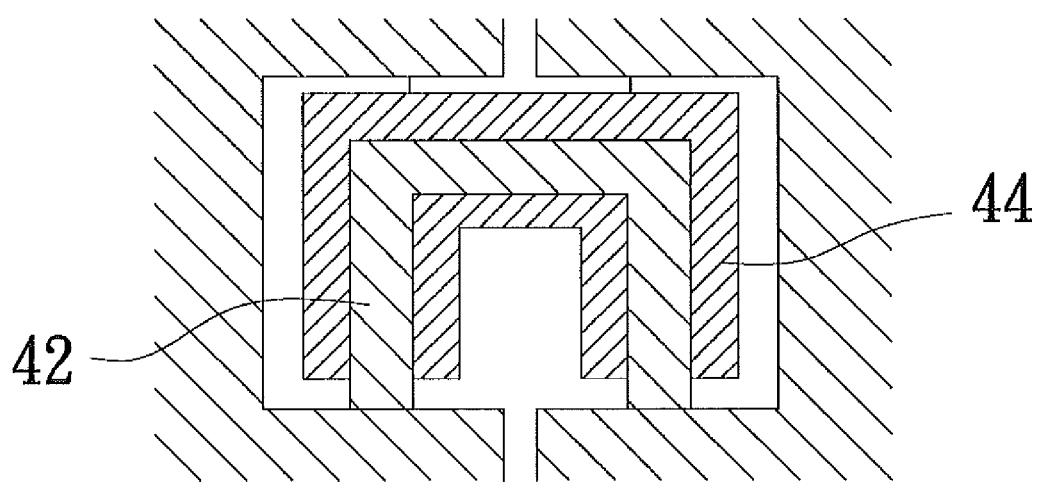
FIG. 6 is an enlarged cross-sectional view of a reverse U-shaped coil set of the present invention.

With reference to FIG. 6 for an enlarged cross-sectional view of a reverse U-shaped coil set of the present invention, a copper coil 44 is wounded around a core 42. An electromagnetic field produced by the current is emitted from the N-pole of the core 42 and transmitted through the electromechanical valve to the cylindrical armature 50 to form a reversed magnetic field, and then returned from the S-pole of the core 42 to constitute a closed cycle. This design can reduce the path of the lines of magnetic force of the coil set and provide a direct low-loss reversed electromagnetic force at the cylindrical armature 50, and the reverse U-shaped core 42 can be used for conducting the lines of magnetic force as well as driving a portion of the lines of magnetic force of the semi-cylindrical permanent magnets 20 to flow in the same direction of lines of magnetic force and enhance the strength of the reversed magnetic force of the coil while supplying a specific required current for the system. In the meantime, the design and installation of the reverse U-shaped coil set 40 limits the reversed electromagnetic field to form the closed cycle between the core 42 and the armature 50, but the electromagnetic field will not enter into the semi-cylindrical permanent magnet 20 to gradually change the magnetic forces of the permanent magnets.

In summation of the description above, the invention complies with the patent application requirements and provides a novel overall structural design of the bidirectional electromechanical valve, a novel structure of the armature, a novel design of the electromechanical valve coil and a novel design of magnetic path to achieve the effects of decreasing the volume of the electromechanical valve, equalizing the valve wear, reducing the energy required by the electromechanical valve, and satisfying the market requirements, and thus the invention is duly filed for patent application.

While the invention has been described by means of specific embodiments, numerous modifications and variations could be made thereto by those skilled in the art without departing from the scope and spirit of the invention set forth in the claims.

What is claimed is:

1. A bi-directional electromechanical valve, comprising:
   a cylindrical upper cover;
   at least two semi-cylindrical permanent magnets, disposed at a bottom of the cylindrical upper cover;
   at least two semi-cylindrical cases, disposed at a bottom of the at least two semi-cylindrical permanent magnets, aligned and engaged with each other to form a cylindrical shape, and having a first internal groove and a second internal groove;
   an inverted U-shaped coil set, installed in the first internal groove, the inverted U-shaped coil set including a core and a coil wounded around the core, and having an inverted U-shaped cross-section;
   a cylindrical armature, installed in the second internal groove;
   a valve stem, with an end coming into contact with the cylindrical armature, and having at least one valve stem latch disposed proximate to a center of the valve stem, and a valve head located at an end of the valve stem for opening and closing a valve;
   a first spring, sheathed onto the valve stem, and installed between the cylindrical armature and the valve stem latch; and
   a second spring, sheathed onto the valve stem, and installed between the valve stem latch and the valve head.

2. The bi-directional electromechanical valve of claim 1, wherein the cylindrical armature includes a protruding cylinder disposed at a position proximate to a bottom of the second internal groove, and each of the at least two semi-cylindrical cases has a recession disposed at a position corresponding to the protruding cylinder, and a height of the protruding cylinder is equal to a depth of the recession.

3. The bi-directional electromechanical valve of claim 2, wherein the protruding cylinder has a diameter slightly smaller than a gap that is formed when the protruding cylinder and the recession are in contact with each other.

* * * * *